United States Patent [19]

McCallum

[11] 4,126,116
[45] Nov. 21, 1978

[54] PORTABLE BARBECUE DEVICE

[76] Inventor: David F. McCallum, 10160-121 St., Edmonton, Alberta, Canada

[21] Appl. No.: 793,032

[22] Filed: May 2, 1977

[51] Int. Cl.² ............................................. F24C 1/16
[52] U.S. Cl. .................................................. 126/9 R
[58] Field of Search .................... 126/9 R, 9 B, 275 R

[56] References Cited

U.S. PATENT DOCUMENTS

| 1,092,027 | 3/1914 | Davis | 126/9 R |
| 1,238,142 | 8/1917 | Hitchcock | 126/9 R UX |
| 2,839,043 | 6/1958 | La Born | 126/9 R |

Primary Examiner—Edgar W. Geoghegan
Attorney, Agent, or Firm—Howard I. Podell

[57] ABSTRACT

A frame consisting of four panels with perforations in the lower portions of each of the panels can be hingedly connected together with long posts which can be driven into the ground after passing through the panel hinges to secure the frame to the ground, a pair of grill sections connected by loops can then be placed over the panels for barbecuing, by removal of one of the posts the frame may be disassembled and then the grill sections can be folded around the panels whereupon a handle can be secured to the tops of the grill sections to carry the disassembled portable barbecue device.

4 Claims, 5 Drawing Figures

PORTABLE BARBECUE DEVICE

I have invented a new and novel and portable barbecue device. My device can use stainless steel posts for driving into the ground during assembly and the device can be transported in a canvas bag for convenience.

My invention can be understood in view of the accompanying figures.

Figure 1:
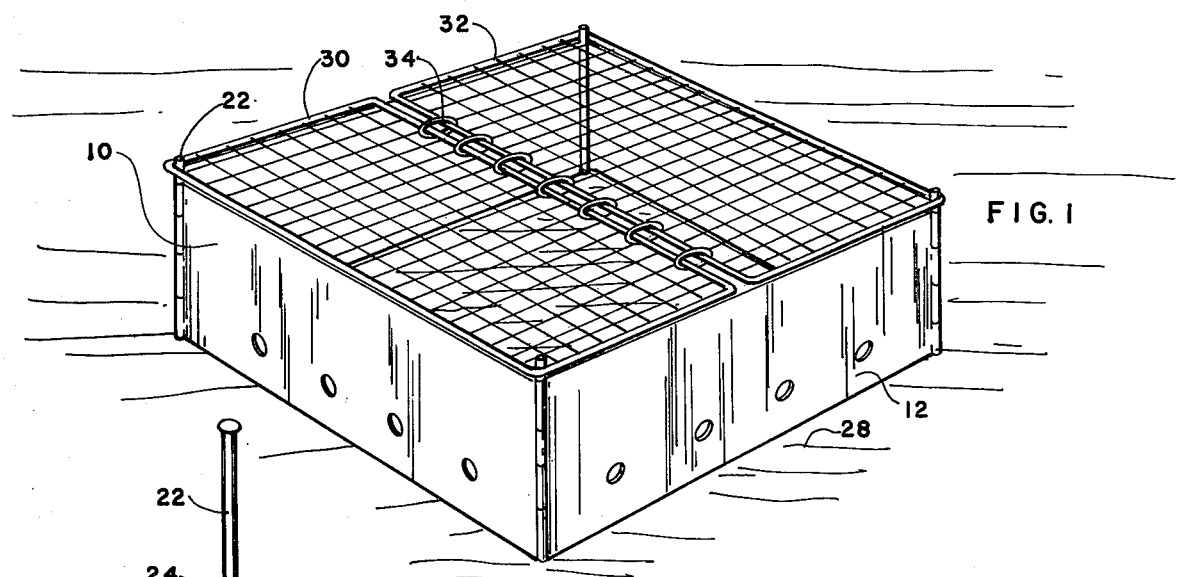
FIG. 1 is a perspective view of the device assembled and in use.
Figure 2:
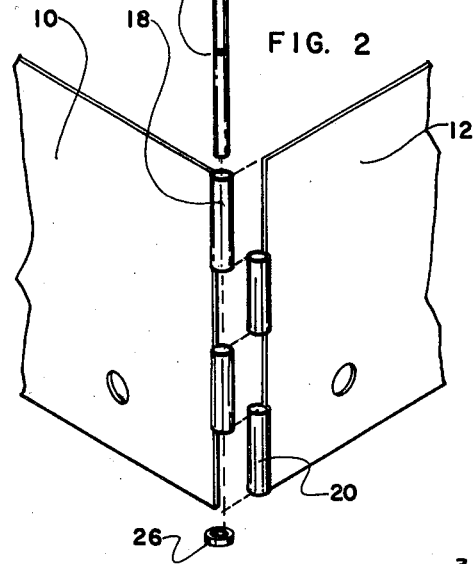
FIG. 2 is a close up view of a section of the device during assembly.
Figure 3:
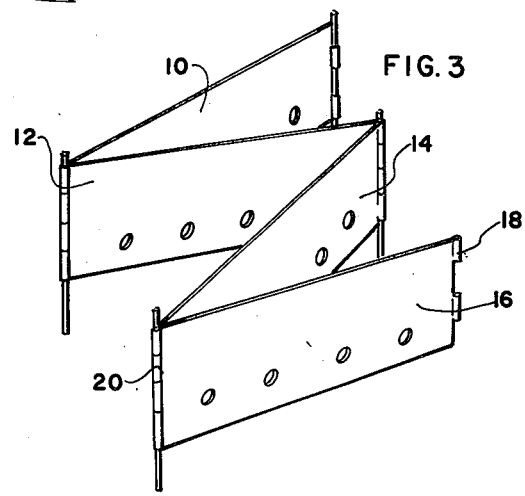
FIG. 3 is a perspective view of the frame of the device during assembly.
Figure 4:
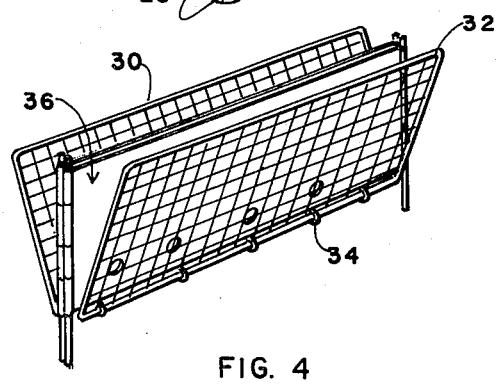
FIG. 4 is a perspective view of the device during preparation for transportation of the device.
Figure 5:
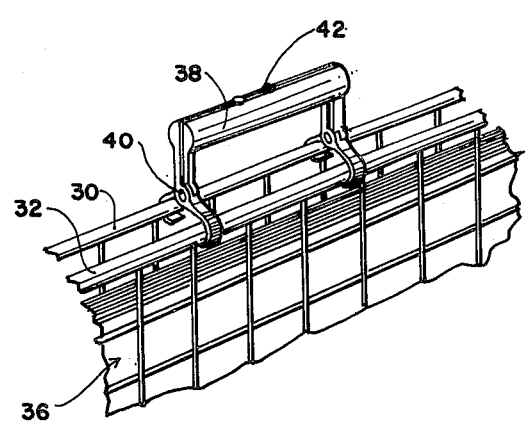
FIG. 5 is a close up of the device assembled for transportation showing the handle attached to the upper part of the device for ease of carrying the device.

With regard to FIGS. 1, 2, 3, 4, and 5, a set of frame panels with perforations in their lower portions 10 12 14 and 16 each have mating hinge members such as 18 and 20 at each end of each panel such as 16 through which posts such as 22 can engage. It is to be noted that the posts 22 are longer than the vertical length of the panels 10 12 14 and 16 so that the lower ends of each of the posts 22 extend downwardly from the panels 10 12 14 and 16. An annular groove 24 in each of the posts 22 can receive a locking washer 26 to hold the posts 22 in the hinge members 18 and 20. With the frame assembled each of the posts 22 can be driven into the ground 28 to secure the frame in place whereupon the grill sections 30 and 32 held together by the loops 34 can be placed over the frame.

When the barbecuing operations have been completed and the frame has been disassembled 36 the grill sections 30 and 32 can be wrapped around the frame 36 and a handle 38 can be pivotably closed 40 so that the hooked lower end of the handle 38 engages the upper ends of the disassembled frame 36. A hook 42 at the top of the handle 38 secures the handle 38 in the closed position, thereby preventing the disassembled frame from separating while facilitating the transport of the disassembled frame.

Having described a preferred embodiment of my invention, it is understood that various changes can be made without departing from the spirit of my invention, and, I desire to cover by the appended claims all such modifications as fall within the true spirit and scope of my invention.

What I claim and seek to secure by Letters Patent is:

1. A portable barbecue device, comprising
   a frame,
   means of securing the frame to a ground, and
   a grill positionable to the frame, wherein
   the frame comprises a set of four panels, and means of connecting the four panels together, wherein
   each of the panels has a plurality of perforations in a lower portion of each of the panels, and wherein
   the means of connecting the panels comprises:
   a mating hinge member attached to each side of each of the panels, and
   a post engageable with adjacent hinges where the sides of each of the panels contacts adjacent sides of adjacent panels, wherein
   each of the posts extends downward through the panels and extends beyond a bottom edge of each of the panels to engage the ground, with each of the posts formed with an annular groove just below the bottom of the panels, and in which a locking washer releaseably engages the annular groove, whereby the posts may be kept in position connecting the panels.

2. The barbecue device of claim 1, wherein the grill comprises a pair of grill sections, and a plurality of loops connecting an adjacent edge of each of the grill sections, whereby the grill may be folded.

3. The barbecue device of claim 2, further comprising:
   a handle attachable to an opposite edge of each of the grill sections, and
   the grill sections mountable around the frame when the frame is disassembled.

4. The barbecue device of claim 3, wherein the handle is hookably secureable around the upper edges of the opposite edges of the grill section, and means of securing the handle in the closed position.

* * * * *